Dec. 17, 1940.   R. K. BRAUNSDORFF   2,224,855
INCANDESCENT LAMP AND METHOD OF MANUFACTURE
Filed April 21, 1938
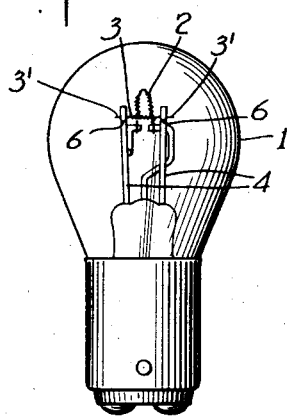
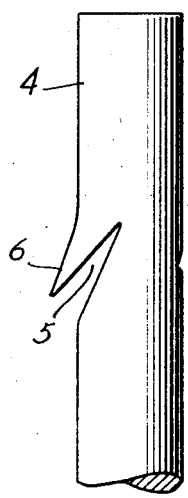
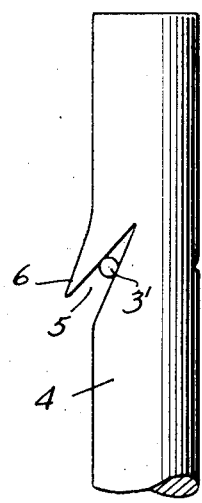
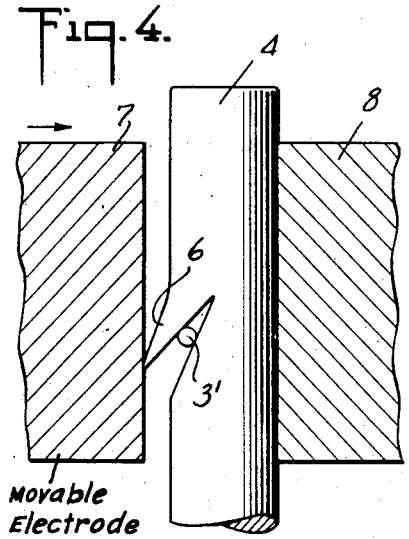
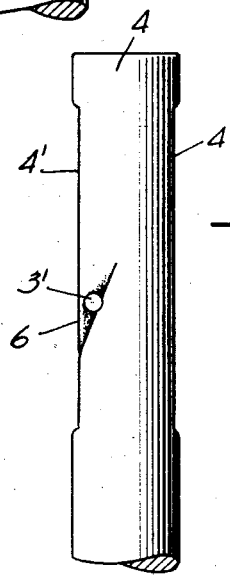
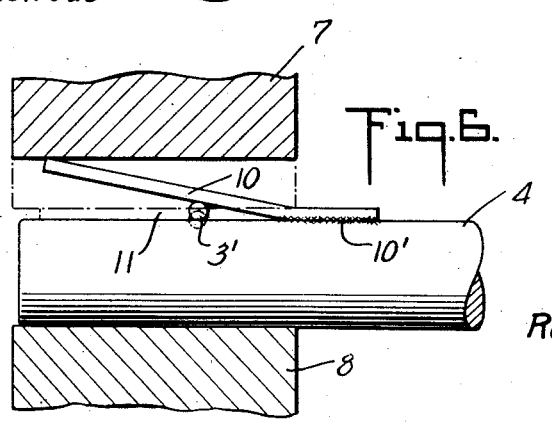
INVENTOR
Reginald K. Braunsdorff
BY
ATTORNEYS Patented Dec. 17, 1940

2,224,855

UNITED STATES PATENT OFFICE 2,224,855

INCANDESCENT LAMP AND METHOD OF MANUFACTURE

Reginald K. Braunsdorff, East Orange, N. J., assignor to Tung-Sol Lamp Works Inc., Newark, N. J., a corporation of Delaware Application April 21, 1938, Serial No. 203,257

6 Claims. (Cl. 176—38)

This invention relates to electric incandescent lamps and to the manufacture thereof.

In the manufacture of filament mounts for miniature incandescent lamps the tungsten filament is often impaired to such an extent that the filament prematurely breaks off from its support, with the result that the lamp has a useful life substantially less than that for which it was designed. This is particularly true of minor or small filaments of two filament miniature bulbs which are welded and fastened to the nickel support wires by the combination of pressure and heat. This fastening in conventional practice is effected by positioning the filament end crosswise of the nickel wire and then with one of the relatively movable welding electrodes in direct engagement with the filament end, the latter is pressed into the nickel wire simultaneously with the supply of electric heating current between the electrodes. The nickel support wire in softened or melting in the area of the weld by the electric current and the tungsten wire terminal is readily pressed thereinto to form a mechanical and electrical connection. Tungsten filaments thus welded and fastened to the nickel wire do not stand up under service conditions and the failure to so stand up is believed to be due to the very high temperature to which the tungsten end or terminal is brought during the weld by the passage therethrough of the whole initial volume of current, whereby its strength is impaired by the disturbance or upsetting of its crystalline structure.

One object of the invention is an incandescent lamp of novel and improved construction and particularly one having a mount of novel and improved construction in which the filament is unimpaired during the welding and fastening operations.

A further object of the invention is a novel method of welding and fastening the tungsten filament to the nickel wire supports whereby the structure of the filament terminal is unimpaired during the welding and fastening operation.

Further objects of the invention will hereinafter appear.

For a better understanding of the invention reference may be had to the accompanying drawing forming a part of this application wherein:

Fig. 1 is a side view of an incandescent lamp embodying the invention;

Figs. 2, 3, 4 and 5 are views illustrating the steps in the mounting of a filament according to the invention; and Fig. 6 illustrates a modification of the invention.

The invention is illustrated as embodied in an incandescent lamp 1 having a principal filament 2 and a minor filament 3. The invention will be described with reference to the welding and fastening of the filament 3 to the nickel wire supports 4. The filament 3 is of tungsten wire and in conventional practice has a diameter of .001 to .003 inch. The nickel wire supports 4 may be of any suitable size, as for example a diameter of around .022 inch.

Referring to the modification of Figs. 2 to 5 the first step according to the invention is to form a diagonal slot or cut 5 in the side of the nickel wire 4. The preferred way to form this slot 5 is by the use of a knife or similar cutting tool in conjunction with a suitable holding frame or die and this operation results in an upsetting of the outer wall of the diagonal slot 5 to form a burr or lip 6.

The next step or steps as shown in Figs. 3 and 4 is to insert an end or terminal 3' of the tungsten filament 3 within this diagonal slot 5 crosswise of the support wire 4 and to position the support wire 4 with the filament end 3' therein between a movable welding electrode 7 and a fixed plate or electrode 8 (Fig. 4). In this position and with the parts thus assembled, when the electrode 7 is reciprocated toward the fixed electrode 8 the electrode does not make direct contact with the filament terminal 3' but, on the contrary, is brought into mechanical and electrical contact only with the nickel wire 4 and the lip or burr 6. The electrode 7 is then caused to bear and press against the support wire 4 with sufficient pressure to flatten out the lip or burr 6 and simultaneously therewith a suitable electric heating current is passed between the electrodes 7 and 8 of a sufficient amount to soften or melt the burr or lip 6 about the filament terminal 3' and weld the lip down firmly in position, as indicated in Fig. 5.

A firm weld and fastening of the terminal 3' to the support wire 4 is thus effected without unduly heating the filament. Very little electric current if any, passes directly through the filament terminal 3' and the temperature rise therein is that due only to the local heating which takes place in the nickel wire 4 and the lip or burr 6. The filament 3. 3' is thus unimpaired and its strength and crystalline structure are maintained during the welding and fastening operation. The nickel support wires 4 are relatively soft with the result that when the relatively movable electrodes 7 and 8 are brought to bear upon the opposite sides of the wire 4 under pressure, the edges 4' of the nickel wire 4 which are engaged by the relatively movable electrodes are slightly flattened as indicated in Fig. 5.

Figs. 2, 3, 4, and 5 are purposely diagrammatic and illustrate the principle of the invention. The diagonal slots 5 may vary in depth and angle and in practice two or more of the steps illustrated in Figs. 2 to 5 may be performed at the same time or substantially at the same time, as for example by assemblying the filament 3 and the two support wires 4 on a machine which includes the relatively movable electrodes 7 and 8 and both terminals 3' of the filaments 3 may be simultaneously welded to the two nickel wire supports 4. Ordinarily also the movable electrode reciprocates vertically while the support wires 4 are horizontally disposed on the fixed electrode or frame 8.

As indicated above, the diagonal slots or cuts 5 may be formed in any convenient manner, as for example by positioning the support wires 4 within cylindrical passages of a die or holding frame in which there is provided a diagonal slot or slots leading to the passages and accommodating the reception of cutting tools of suitable hardness and cutting edge to form the diagonal slots 5 and upset the lips or burrs 6. The filament terminals 3' may be fastened within the slots 5 by bringing the movable electrode 7 under high pressure against the side of the support wire 4 including the burr or lip 6, unaccompanied by the supply of electric heating current between the electrodes 7 and 8, but a more satisfactory weld and fastening is effected by the simultaneous use of both pressure and electric current.

In Fig. 6 is illustrated a modification of the invention. Here the filament terminal 3' is assembled crosswise of the nickel wire support 4 underneath a strip of nickel ribbon 10 which is welded at one end 10' to the nickel wire. The nickel strip 10 forms a lip somewhat similar to the lip 6 described above and after the assembly of the terminal 3' within the gap 11 (between the strip 10 and wire 4) the movable electrode 7 is brought down under pressure to the position indicated in dotted lines to weld and fasten the strip 10 throughout its length to the nickel wire 4 and about the filament terminal 3', as indicated in dotted lines. An electric heating current is supplied between the electrodes 7 and 8 simultaneously with the bringing of the electrodes against the wire support 4 and strip 10, as described above in connection with Fig. 4. The nickel strip or ribbon 10 may be of any suitable size, as for example .005 inch by .015 inch, and as indicated above the support wire 4 may be of any suitable size, as for example around 0.02 inch diameter.

The weld and fastening of Fig. 6 also result in a filament 3, 3' which is unimpaired in its strength, durability and crystalline structure, but the practice of Figs. 2, 3, 4 and 5 described above is the preferred practice.

I claim:

1. In an incandescent electric lamp, a filament support wire and a filament disposed at an angle thereto having a terminal embedded therein under a lip disposed on the side thereof, said lip being flattened against and electrically welded to the support wire about the filament terminal with the crystalline structure of the latter unimpaired by the heating current.

2. In an incandescent lamp of the character set forth in claim 1 wherein the lip is formed integrally with and coalesces with the support wire and is flowed around the filament terminal.

3. In an incandescent electric lamp, a filament support wire and a filament disposed at an angle thereto having a terminal embedded therein under a lip disposed on the side thereof, said lip being flattened against and electrically welded to the support wire about the filament terminal with the crystalline structure of the latter unimpaired by the heating current, the lip being a separate strip or member which is welded at one point to the support wire and coalesces with and is flowed around the filament terminal at another point.

4. The method of mounting a filament of an electric incandescent lamp upon mount support wires which includes the steps of assembling the filament terminals underneath lips carried by the sides of the support wires and flattening under pressure the lips about the terminals of the filament while simultaneously supplying electric and welding heating current through said lips and the main bodies of the support wire with the lips forming a shunt for the heating current past the terminals.

5. The method of mounting a filament of an incandescent lamp upon support wires of a mount which includes the steps of forming diagonal slots in the sides of the support wire and upsetting lips therefrom, assembling a filament with the filament terminals disposed in the diagonal slots and beneath the lips and pressing the lips about the filament terminals while simultaneously supplying electric heating current between the lips and the main bodies of the support wire with the lips forming a shunt for the heating current past the terminals.

6. The method of mounting a filament of an electric incandescent lamp upon mount support wires which includes the steps of assembling the filament terminals underneath lips carried by the sides of the support wires and flattening under pressure the lips about the terminals of the filament while simultaneously supplying electric heating current through said lips and the main bodies of the support wire to heat the lips and the main bodies to the welding point solely by the passage of current therethrough without the passage of current through the terminals, the lips being formed by welding metallic strips at one end to the support wires.

REGINALD K. BRAUNSDORFF.